US012092265B2

(12) United States Patent
Woo

(10) Patent No.: US 12,092,265 B2
(45) Date of Patent: Sep. 17, 2024

(54) APPARATUS AND METHOD FOR CONTROLLING PRESSURE VESSEL

(71) Applicants: HYUNDAI MOTOR COMPANY, Seoul (KR); Kia Corporation, Seoul (KR)

(72) Inventor: Myeong Nam Woo, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 313 days.

(21) Appl. No.: 17/559,012

(22) Filed: Dec. 22, 2021

(65) Prior Publication Data

US 2022/0205594 A1 Jun. 30, 2022

(30) Foreign Application Priority Data

Dec. 24, 2020 (KR) ........................ 10-2020-0183847

(51) Int. Cl.
*F17C 13/08* (2006.01)
*F17C 13/02* (2006.01)

(52) U.S. Cl.
CPC ............ *F17C 13/08* (2013.01); *F17C 13/025* (2013.01); *F17C 2205/0107* (2013.01); *F17C 2205/0184* (2013.01); *F17C 2250/043* (2013.01); *F17C 2250/0469* (2013.01); *F17C 2250/0694* (2013.01); *F17C 2250/072* (2013.01); *F17C 2260/018* (2013.01)

(58) Field of Classification Search
CPC .................... F17C 13/08; F17C 13/025; F17C 2205/0107; F17C 2205/0184; F17C 2250/043; F17C 2250/0469; F17C 2250/0694
USPC ............................................ 220/560.05, 211
See application file for complete search history.

(56) References Cited

U.S. PATENT DOCUMENTS

| | | | | |
|---|---|---|---|---|
| 8,925,753 B2 * | 1/2015 | Maybury, Jr. | E02F 3/925 | 49/340 |
| 10,556,506 B2 * | 2/2020 | Sasaki | F17C 13/084 | |
| 2014/0239624 A1 * | 8/2014 | Maybury, Jr. | B60P 3/22 | 220/314 |
| 2016/0096495 A1 * | 4/2016 | Sasaki | F16M 13/02 | 248/505 |
| 2020/0108511 A1 * | 4/2020 | Inoue | B25J 19/02 | |
| 2023/0250837 A1 * | 8/2023 | Oishi | F15B 1/04 | 248/632 |

(Continued)

FOREIGN PATENT DOCUMENTS

| | | | | |
|---|---|---|---|---|
| CN | 109210371 A | * | 1/2019 | |
| CN | 110425422 A | * | 11/2019 | F17C 13/08 |
| DE | 102012004319 A1 | * | 9/2013 | B60K 15/067 |

(Continued)

*Primary Examiner* — J. Gregory Pickett
*Assistant Examiner* — Niki M Eloshway
(74) *Attorney, Agent, or Firm* — MORGAN, LEWIS & BOCKIUS LLP

(57) ABSTRACT

Disclosed is an apparatus for controlling a pressure vessel including a clamp that surrounds an outer peripheral surface of the pressure vessel fixed to a subject target, a driver that provides a driving force for adjusting a fastening force of the clamp according to an internal pressure of the pressure vessel, and a controller that performs a control such that rotation of the driver is prevented during an abnormal operation of the driver.

14 Claims, 13 Drawing Sheets

(56) References Cited

U.S. PATENT DOCUMENTS

2023/0392755 A1* 12/2023 Ohba .................... F17C 13/084

FOREIGN PATENT DOCUMENTS

DE 102017105805 A1 * 9/2018
KR 2017002953 U * 8/2017 .............. F16B 2/065
WO WO-2019123492 A1 * 6/2019

* cited by examiner

APPARATUS AND METHOD FOR CONTROLLING PRESSURE VESSEL

CROSS-REFERENCE TO RELATED APPLICATION

This application claims the benefit of priority to Korean Patent Application No. 10-2020-0183847, filed in the Korean Intellectual Property Office on Dec. 24, 2020, the entire contents of which are incorporated herein by reference.

TECHNICAL FIELD

The present disclosure relates to an apparatus and a method for controlling a pressure vessel.

BACKGROUND

A hydrogen vehicle is configured to travel by produce electricity by itself through a chemical reaction of hydrogen and oxygen and driving a motor. In more detail, the hydrogen vehicle includes a pressure vessel, in which hydrogen ($H_2$) is stored, a fuel cell stack that produces electricity through an oxidation/reduction reaction of hydrogen and oxygen ($O_2$), various devices for draining the generated water, a battery that stores electricity produced by the fuel cell stack, a controller that converts and controls the produced electricity, and a motor that generates a driving force.

A pressure vessel of the hydrogen vehicle may be a pressure vessel of type 4. The pressure vessel of type 4 may include a liner (for example, a nonmetallic material) and a carbon fiber layer formed by winding a carbon fiber composite material on an outer surface of the liner.

Meanwhile, because the pressure vessel of the hydrogen vehicle is frequently exposed to an environment, in which the hydrogen is repeatedly expanded and contracted as the hydrogen is charged and discharged, a displacement of the pressure vessel due to the expansion and contraction of the pressure vessel has to be effectively absorbed.

Furthermore, when the pressure vessel is expanded in one direction in a biased way during charging of the hydrogen, stresses occur in components (for example, a valve, a pipeline, and a manifold) connected to the pressure vessel to increase a danger of leakage of the hydrogen, and thus the hydrogen tank has to be expanded uniformly in all directions with respect to the center of the pressure vessel.

However, conventionally, among an upper clamp and a lower clamp mounted to a fixed frame (a fixed frame fixed to a body of the hydrogen vehicle) to surround an outer peripheral surface of the pressure vessel, only the upper clamp may absorb a displacement of the pressure vessel (a location of the upper clamp that surrounds a circumference of the pressure vessel may vary in correspondence to the expansion of the pressure vessel), and the lower clamp is integrally fixed to the fixed frame (fixed through welding not to absorb the displacement of the pressure vessel), and thus the pressure vessel is expanded only in a direction that faces the upper clamp in a biased way during charging of the hydrogen.

Moreover, the upper clamp may be fixed or released while a shaft screw of a motor is rotated, and a fastening force of the upper clamp may be controlled according to a pressure of the hydrogen tank.

Accordingly, when a motor or a control unit for driving the motor is abnormally operated, the hydrogen tank is moved from the vehicle frame, and thus hydrogen gas may leak from a hydrogen tube pipe, through which high-pressure hydrogen gas passes, or connection parts thereof so that a dangerous situation may be encountered.

SUMMARY

The present disclosure has been made to solve the above-mentioned problems occurring in the prior art while advantages achieved by the prior art are maintained intact.

An aspect of the present disclosure provides an apparatus and a method for controlling a pressure vessel, which may secure the safety of a user by applying a fail safety structure provided with a backup measure to safely fix a hydrogen tank to a hydrogen tank fixing mechanism and thus preventing leakage of hydrogen that may be generated due to a breakdown or an abnormal operation of main electronic components (a motor and a CPU) that fix the hydrogen tank.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a pressure vessel includes a clamp that surrounds an outer peripheral surface of the pressure vessel fixed to a subject target, a driver that provides a driving force for adjusting a fastening force of the clamp according to an internal pressure of the pressure vessel, and a controller that performs a control such that rotation of the driver is prevented during an abnormal operation of the driver.

In an embodiment, the controller may control an operation of a stopper that optionally restricts rotation of the driver.

In an embodiment, the clamp may include a first clamp that surrounds a portion of the outer peripheral surface of the pressure vessel, and a second clamp that surrounds another portion of the outer peripheral surface of the pressure vessel.

In an embodiment, the first clamp may include a first force sensor that senses a force applied to the first clamp, and the second clamp may include a second force sensor that senses a force applied to the second clamp.

In an embodiment, the controller may include a main controller and a sub controller that each calculates the fastening force of the clamp, and the controller may determine that the driver is in a normal operation when the fastening force of the clamp calculated by the main controller coincides with the fastening force of the clamp calculated by the sub controller while a difference between the fastening force of the clamp measured through the first force sensor and the fastening force of the clamp calculated by the main controller is within a specific range.

In an embodiment, the controller may determine that the driver is in the normal operation when the fastening force of the clamp calculated by the main controller coincides with the fastening force of the clamp calculated by the sub controller while a difference between the fastening force of the clamp measured through the second force sensor and the fastening force of the clamp calculated by the main controller is within the specific range in a condition that the difference between the fastening force of the clamp measured through the first force sensor and the fastening force of the clamp calculated by the main controller deviates from the specific range.

In an embodiment, the controller may determine that the driver is in the abnormal operation when the difference between the fastening force of the clamp measured through the second force sensor and the fastening force of the clamp calculated by the main controller deviates from the specific range or the fastening force of the clamp calculated by the main controller does not coincide with the fastening force of the clamp calculated by the sub controller.

According to another aspect of the present disclosure, a method for controlling a pressure vessel includes providing a driver that adjusts a fastening force of a clamp according to an internal pressure of the pressure vessel that surrounds an outer peripheral surface of the pressure vessel through a clamp, and performing a control such that rotation of the driver is prevented during an abnormal operation of a driver that provide the driving force.

In an embodiment, the performing of the control such that rotation of the driver is prevented during an abnormal operation of a driver that provide the driving force may include controlling an operation of a stopper that optionally restricts rotation of the driver.

In an embodiment, the providing of the driver that adjusts a fastening force of a clamp according to an internal pressure of the pressure vessel that surrounds an outer peripheral surface of the pressure vessel through a clamp may include providing a driving force for adjusting a fastening force between a first clamp that surrounds a portion of the outer peripheral surface of the pressure vessel and a second clamp that surrounds another portion of the outer peripheral surface of the pressure vessel.

In an embodiment, the performing of the control such that rotation of the driver is prevented during an abnormal operation of a driver that provides the driving force may include receiving a measurement value of a force applied to the first clamp from a first force sensor included in the first clamp, and receiving a measurement value of a force applied to the second clamp from a second force sensor included in the second clamp.

In an embodiment, the performing of the control such that rotation of the driver is prevented during an abnormal operation of a driver that provides the driving force may include calculating a fastening force of the clamp through each of a main controller and a sub controller, and the method may include determining that the driver is in a normal operation when the fastening force of the clamp calculated by the main controller coincides with the fastening force of the clamp calculated by the sub controller while a difference between the fastening force of the clamp measured through the first force sensor and the fastening force of the clamp calculated by the main controller is within a specific range.

In an embodiment, the performing of the control such that rotation of the driver is prevented during an abnormal operation of a driver that provides the driving force may include determining that the driver is in the normal operation when the fastening force of the clamp calculated by the main controller coincides with the fastening force of the clamp calculated by the sub controller while a difference between the fastening force of the clamp measured through the second force sensor and the fastening force of the clamp calculated by the main controller is within the specific range in a condition that the difference between the fastening force of the clamp measured through the first force sensor and the fastening force of the clamp calculated by the main controller deviates from the specific range.

In an embodiment, the performing of the control such that rotation of the driver is prevented during an abnormal operation of a driver that provides the driving force may include determining that the driver is in the abnormal operation when the difference between the fastening force of the clamp measured through the second force sensor and the fastening force of the clamp calculated by the main controller deviates from the specific range or the fastening force of the clamp calculated by the main controller does not coincide with the fastening force of the clamp calculated by the sub controller.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
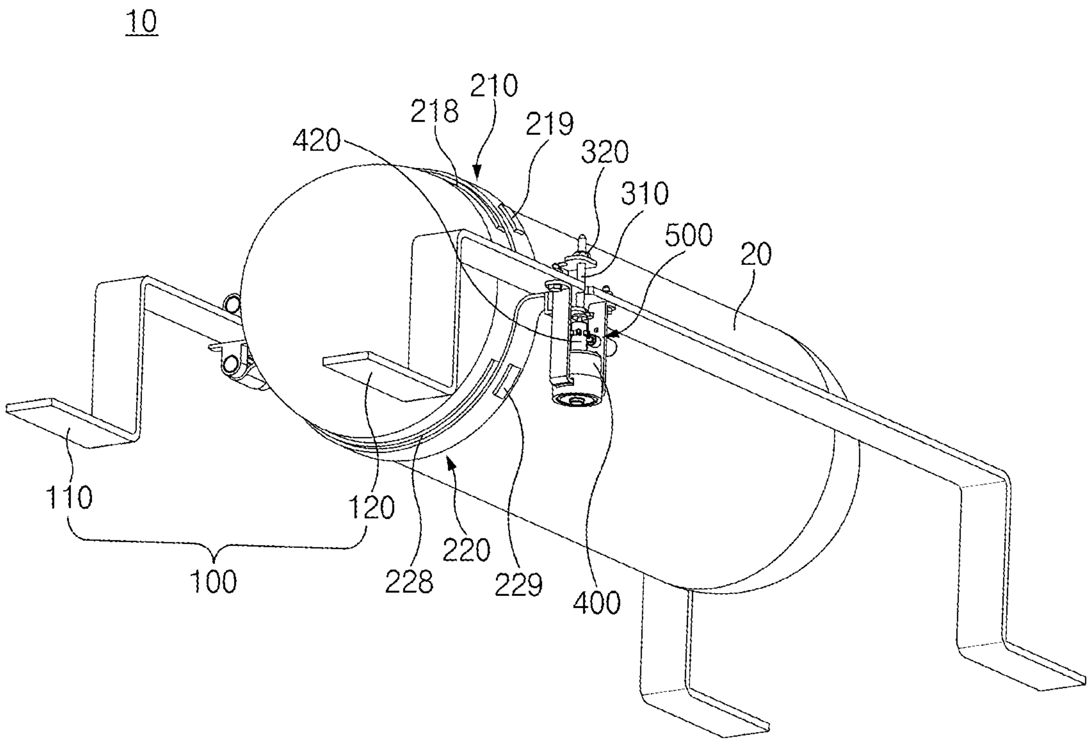
FIG. 1 is a perspective view illustrating a pressure vessel fixing apparatus according to an embodiment of the present disclosure.

Hereinafter, some embodiments of the present disclosure will be described in detail with reference to the exemplary drawings. Throughout the specification, it is noted that the same or like reference numerals denote the same or like components even though they are provided in different drawings. Further, in the following description of the present disclosure, a detailed description of known functions and configurations incorporated herein will be omitted when it may make the subject matter of the present disclosure rather unclear.

The terms, such as first, second, A, B, (a), (b) or the like may be used herein when describing components of the present disclosure. The terms are provided only to distinguish the components from other components, and the essences, sequences, orders, and the like of the components are not limited by the terms. In addition, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

Referring to FIGS. 1 to 10, a pressure vessel fixing apparatus 10 for fixing a pressure vessel 20 to a subject target according to an embodiment of the present disclosure includes a frame part 100 fixed to the subject target, a first clamp 210 supported by the frame part 100 and that surrounds a portion of an outer peripheral surface of the pressure vessel 20, a second clamp 220 supported by the frame part 100 and that surrounds another portion of the outer peripheral surface of the pressure vessel 20, a first fastening member provided in the clamp 210 to be rotatable, a second fastening member 320 connected to the second clamp 220, and fastened to the first fastening member 310 to be linearly movable along a lengthwise direction of the first coupling member 310 in correspondence to rotation of the first fastening member 310, a driver 400 that provides a driving force for rotating the first coupling member 310, a coupler 420 that connects the driver 400 and the first fastening member 310 and transmits the driving force of the driver 400 to the first fastening member 310, and a stopper that selectively restricts rotation of the coupler 420.

For reference, the pressure vessel fixing apparatus 10 according to the embodiment of the present disclosure may be used to fix the pressure vessel 20 to various subject targets, and the present disclosure is neither limited nor restricted by a kind and a structure of the subject target, to which the pressure vessel 20 is fixed.

For example, the pressure vessel fixing apparatus 10 according to the embodiment of the present disclosure may be used to fix the pressure vessel 20 to an interior of a vehicle (e.g., a car or a commercial vehicle).

High-pressure compressed hydrogen may be stored in an interior of the pressure vessel 20. As an example, the pressure vessel 20 may include a linear (not illustrated), a carbon fiber layer (not illustrated) formed to surround an outer surface of the liner, and a glass fiber layer (not illustrated) formed to surround an outer surface of the carbon fiber layer, and the pressure vessel 20 may be selectively expanded or contracted according to a pressure of hydrogen stored in the pressure vessel 20.

The frame part 100 is configured to fix the pressure vessel 20 to a subject target (for example, a vehicle body of the vehicle) by a medium of a first clamp 210 and a second clamp 220.

The frame part 100 may be various structures that may fix the pressure vessel 20 to the subject target, and the present disclosure is neither limited nor restricted by a structure of the frame part 100.

As an example, the frame part 100 may include a first frame member 110 to which the subject target is fixed, and a second frame member 120 fixed to the subject target to be spaced apart from the first frame member 110.

The first frame member 110 is fixed to the subject target (for example, the vehicle body of the vehicle).

A structure and a shape of the first frame member 110 may be variously changed according to a condition and a design specification that are required, and the present disclosure is neither limited nor restricted by the shape and the structure of the first frame member 110.

As an example, the first frame member 110 may have a bent structure including a holder (not illustrated) having a substantially "stapler" cross-sectional shape, and opposite ends of the first frame member 110 may be fixed to the subject target by using a general fastening member.

The second frame member 120 is fixed to the subject target (for example, the body of the vehicle) to be spaced apart from the first frame member 110, and a holding space, in which the pressure vessel 20 is held, is provided between the first frame member 110 and the second frame member 120.

A structure and a shape of the second frame member 120 may be variously changed according to a condition and a design specification that are required, and the present disclosure is neither limited nor restricted by the shape and the structure of the second frame member 120. Preferably, the second frame member 120 may have the same structure as that of the first frame member 110.

As an example, the second frame member 120 may have a bent structure including a holder (not illustrated) having a substantially "stapler" cross-sectional shape, and opposite ends of the second frame member 120 may be fixed to the subject target by using a general fastening member.

Referring to FIGS. 1 to 5, the first clamp 210 and the second clamp 220 are provided to fix the pressure vessel 20 to the first frame member 110 and the second frame member 120 mutually cooperatively.

The numbers and disposition intervals of the first clamps 210 and the second clamps 220 may be variously changed according to a condition and a design specification that are required, and the present disclosure is neither limited nor restricted by the numbers and the disposition intervals of the first clamps 210 and the second clamps 220.

As an example, the pressure vessel 20 may be fixed by only one first clamp 210 and a second clamp 220. According to another embodiment of the present disclosure, the pressure vessel fixing apparatus may include two or more first clamps and two or more second clamps.

In more detail, the first clamp 210 may include a first clamp body 212 that surrounds a portion of the outer peripheral surface of the pressure vessel 20, a first connector 214 formed at one end of the first clamp body 212 and connected to the first frame member 110, and a first extension 216 that extends from another end of the first clamp body 212.

A material of the first clamp 210 may be variously changed according to a condition and a design specification that are required. As an example, the first clamp 210 may be formed by continuously bending a band-shaped member of a metallic material.

The first clamp body 212 may be configured to surround a partial section of the outer peripheral surface of the pressure vessel 20.

As an example, the first clamp body 212 may be bent to have a substantially semicircular shape and may be adhered to the outer surface of the pressure vessel 20 to surround the outer peripheral surface of the pressure vessel 20 corresponding to an upper section (with reference to FIG. 3) of the pressure vessel 20.

According to another embodiment of the present disclosure, the first clamp body may be configured to surround a side section or the other sections of the pressure vessel.

The first connector 214 may be integrally connected to one end of the first clamp body 212 to be bent, and is connected to the first frame member 110.

Here, an aspect that the first connector 214 is connected to the first frame member 110 is defined as a meaning that the first connector 214 is either fixed (for example, fixed through a bolt or a rivet) to the first frame member 110 or connected to the first frame member 110 to be rotatable.

As an example, the first connector 214 may be integrally connected (extend from) to one end of the first clamp body 212. According to another embodiment of the present disclosure, the first connector may be coupled to or assembled in one end of the first clamp body.

The first extension 216 integrally extends from another end of the first clamp body 212 to be bent.

The first extension 216 may have various structures that may support the first fastening member 310 such that the first fastening member 310 is rotatable, and the present disclosure is neither limited nor restricted by the structure of the first extension 216.

As an example, the first extension 216 may integrally extends from another end of the first clamp body 212 to protrude along a radial direction of the first clamp body 212.

The second clamp 220 includes a second clamp body 222 that surrounds a portion of the outer peripheral surface of the pressure vessel 20, a second connector 224 formed at one end of the second clamp body 222 and connected to the first frame member 110, and a second extension 226 that extends from another end of the second clamp body 222.

A material of the second clamp 220 may be variously changed according to a condition and a design specification that are required. As an example, the second clamp 220 may be formed by continuously bending a band-shaped member of a metallic material.

The second clamp body 222 may be configured to surround a partial section of the outer peripheral surface of the pressure vessel 20.

As an example, the second clamp body 222 may be bent to have a substantially semicircular shape and may be adhered to the outer surface of the pressure vessel 20 to surround the outer peripheral surface of the pressure vessel 20 corresponding to a lower section (with reference to FIG. 3) of the pressure vessel 20. According to another embodiment of the present disclosure, the second clamp body may be configured to surround a side section or the other sections of the pressure vessel.

The second connector 224 may be integrally connected to one end of the second clamp body 222 to be bent, and is connected to the first frame member 110.

Here, an aspect that the second connector 224 is connected to the second frame member 110 is defined as a meaning that that the second connector 224 is either fixed to the first frame member 110 or connected to the first frame member 110 to be rotatable.

As an example, the second connector 224 may be integrally connected (extend from) to one end of the second clamp body 222. According to another embodiment of the present disclosure, the second connector may be coupled to or assembled in one end of the second clamp body.

The second extension 226 integrally extends from another end of the second clamp body 222 to be bent.

The second extension 226 may have various structures that may fix (or connect) the second fastening member 320 such that the second fastening member 320 is rotatable, and the present disclosure is neither limited nor restricted by the structure of the second extension 226.

As an example, the second extension 226 may integrally extends from another end of the second clamp body 222 to protrude along a radial direction of the second clamp body 222.

The first fastening member 310 and the second fastening member 320 may be configured to optionally move the first clamp 210 relatively to the second clamp 220 (move the first clamp such that the first clamp and the second clamp approach each other or become spaced apart from each other) while giving fastening forces, by which the first clamp 210 and the second clamp 220 fasten the pressure vessel 20, and a distance L between the first extension 216 and the second extension 226 may vary in correspondence to linear movement of the second fastening member 320 according to rotation of the first fastening member 310.

In more detail, the first fastening member 310 is provided in the first extension 216 of the first clamp 210 to be rotatable. Furthermore, the second fastening member 320 is connected to the second extension 226 of the second clamp 220, and is coupled to the first fastening member 310 to be linearly movable along a lengthwise direction of the first fastening member 310 in correspondence to rotation of the first fastening member 310.

A linear movement direction of the second fastening member 320 according to the rotation of the first fastening member 310 may be variously implemented according to a condition and a design specification that are required.

As an example, when the first fastening member 310 is rotated in a first direction (for example, a clockwise direction), the second extension 226, to which the second fastening member 320 is fixed, may be moved in a direction (a downward direction with reference to FIG. 2), in which the second extension 226 approaches the first extension 216. In contrast, when the first fastening member 310 is rotated in a second direction (for example, a counterclockwise direction), the second extension 226, to which the fastening member is fixed, may be moved in a direction (an upward direction with reference to FIG. 2), in which the second extension 226 becomes spaced apart from the first extension 216.

Various members that may convert rotation of the first fastening member 310 to linear movement of the second fastening member 320 may be used as the first fastening member 310 and the second fastening member 320, and the present disclosure is neither limited nor restricted by the kinds and the structures of the first fastening member 310 and the second fastening member 320.

As an example, a general bolt may be used as the first fastening member 310, and a nut may be used as the second fastening member 320.

According to a preferred embodiment of the present disclosure, the first fastening member 310 may include a shaft 312 having a screw thread (not illustrated) on an outer peripheral surface thereof and to which the second fastening member 320 is screw-coupled, and a support 314 that supports the shaft 312 to the first extension 216.

The shaft 312 may be provided in a linear rod shape having a specific length and having a circular cross-section, and the second fastening member 320 may be screw-coupled to an end of the shaft 312, which passes through a through-hole 226*a* formed in the second extension 226.

The support 314 may have various structures that may support the shaft 312 on the first extension 216, and the present disclosure is neither limited nor restricted by a structure of the support 314.

As an example, the support 314 may include a first flange 314*a* formed in the shaft 312 to have a cross-section (for example, an enlarged diameter) that is larger than that of the shaft 312, and supported on one surface of the first extension 216, and a second flange 314*b* spaced apart from the first flange 314*a*, formed in the shaft 312 to have a cross-section (for example, an enlarged diameter) that is larger than that of the shaft 312, and supported on another surface of the first extension 216.

The first flange 314*a* and the second flange 314*b* may be disposed on opposite surfaces (an upper surface and a bottom surface with reference to FIG. 2) of the first extension 216 while the first extension 216 being interposed therebetween to support (fix) the shaft 312 on (to) the first extension 216.

Preferably, the first extension 216 may be provided with a support hole 216*a*, in which the shaft 312 is accommodated.

More preferably, the support hole 216*a* may be formed to have an entrance part (opening) (not illustrated) having a diameter that is smaller than that of the shaft 312, and the shaft 312 may be accommodated in an interior of the support hole 216*a* through the entrance part of the support hole 216*a* through a snap-fit scheme.

Figure 2:
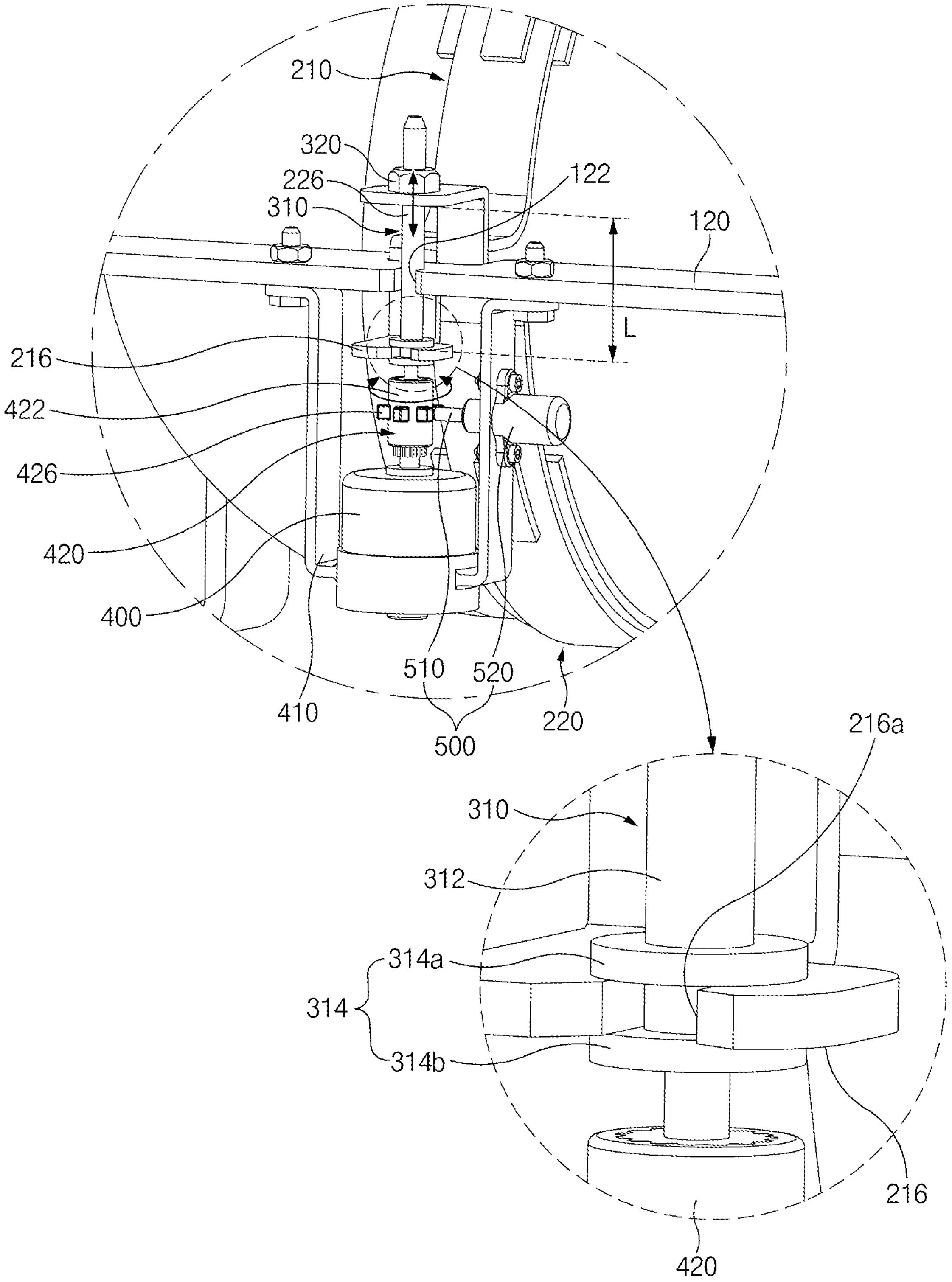
FIG. 2 is a view illustrating a pressure vessel fixing apparatus according to an embodiment of the present disclosure, and illustrates a connection structure of a first clamp and a second clamp.
Figure 3:
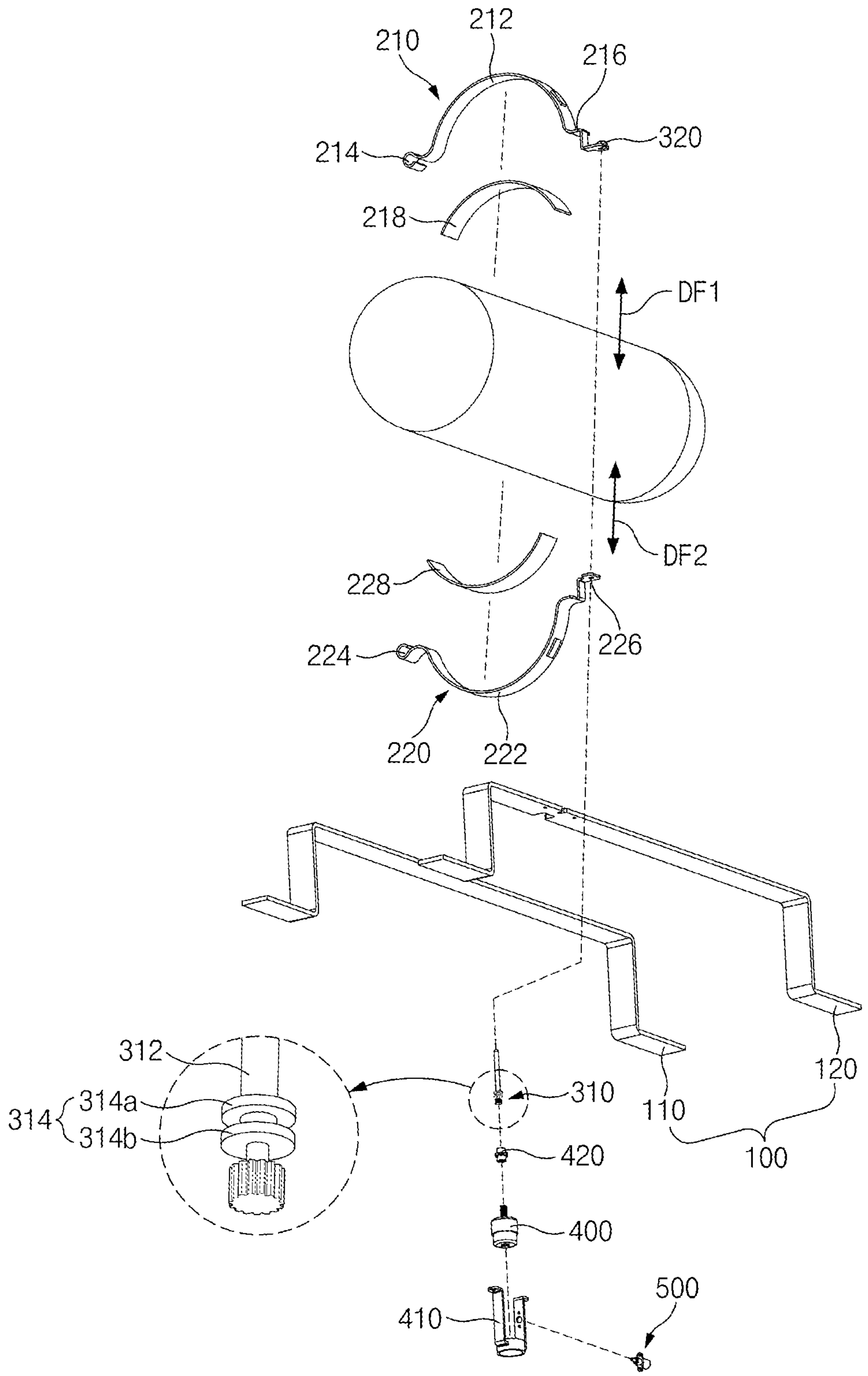
FIGS. 3 and 4 are exploded perspective views illustrating a pressure vessel fixing apparatus according to an embodiment of the present disclosure.
Figure 4:
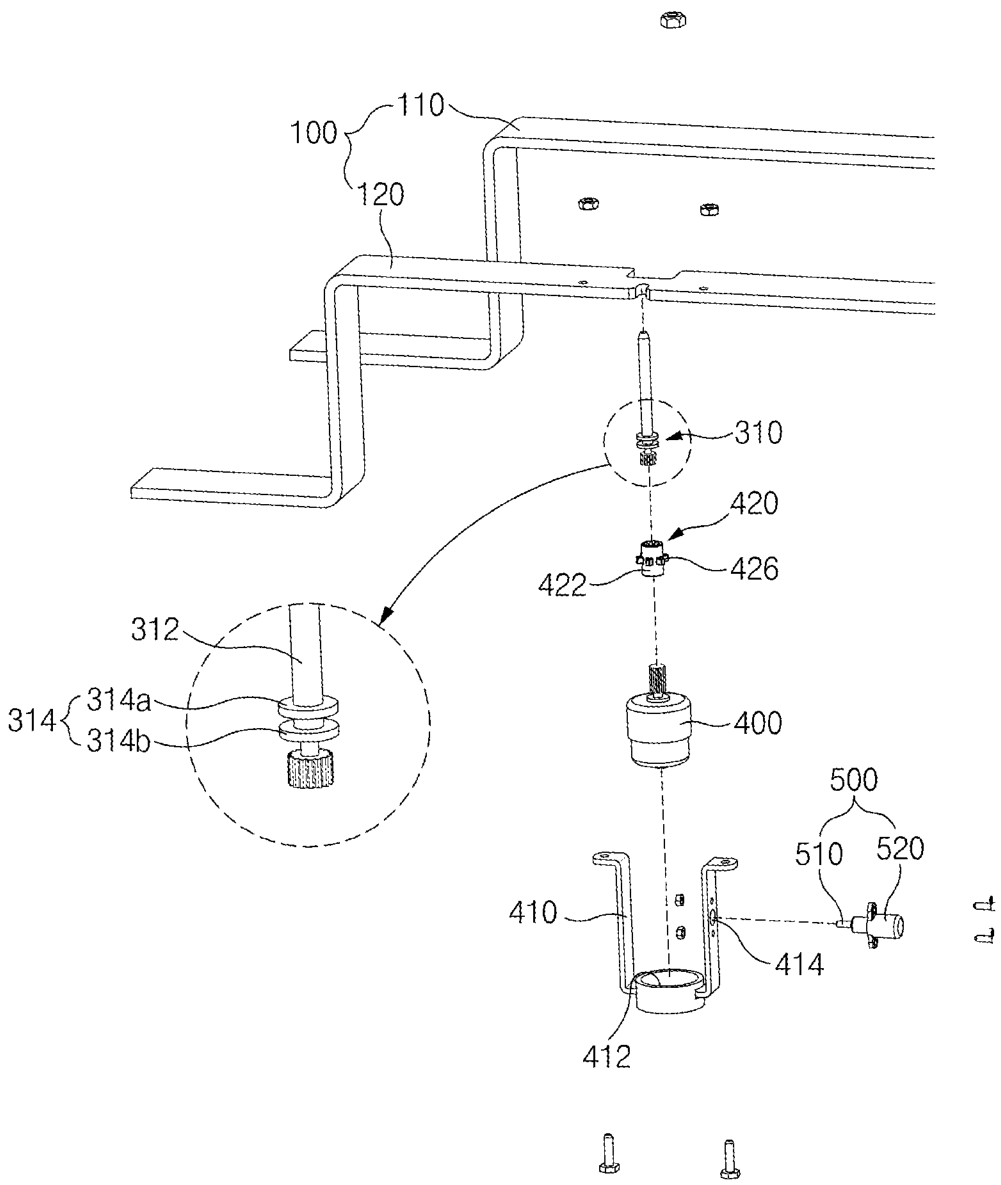
Figure 5:
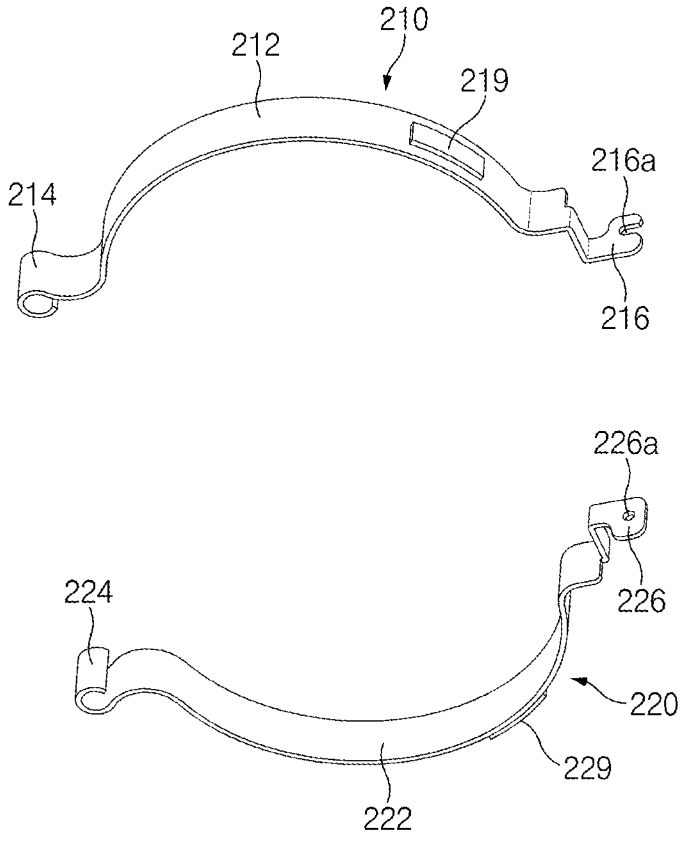
FIG. 5 is a view illustrating a pressure vessel fixing apparatus according to an embodiment of the present disclosure, and illustrates a first clamp and a second clamp.

In this way, by accommodating the shaft 312 in the support hole 216*a*, movement of the shaft 312 with respect to the first extension 216 (for example, horizontal movement of the shaft 312 with reference to FIG. 2) may be restrained, and a disposition state of the shaft 312 may be maintained more stably.

Figure 6:
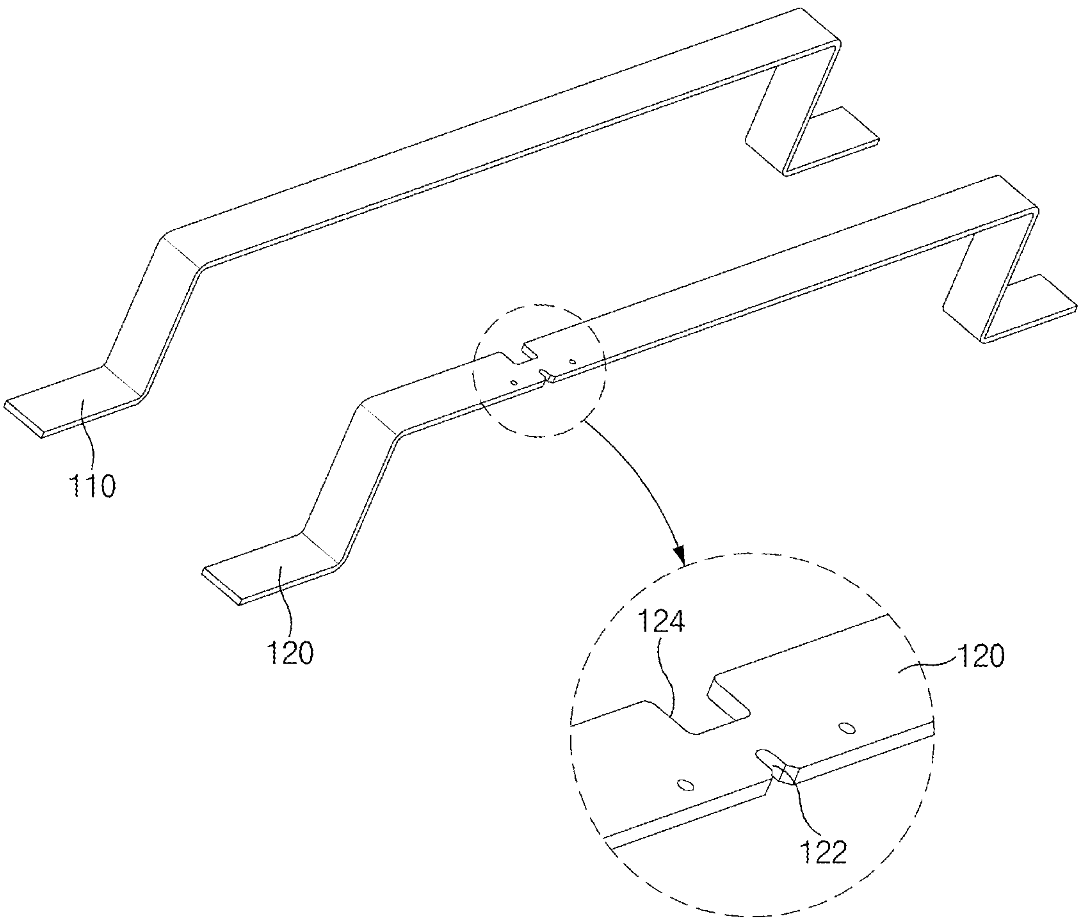
FIG. 6 is a view illustrating a pressure vessel fixing apparatus according to an embodiment of the present disclosure, and illustrates a frame part.
Figure 7:
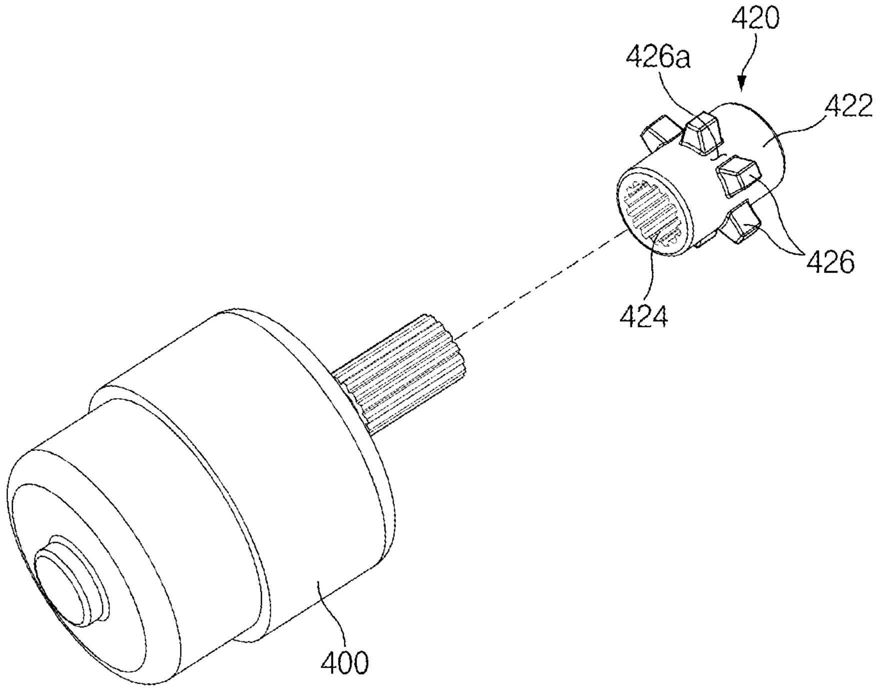
FIG. 7 is a view illustrating a pressure vessel fixing apparatus according to an embodiment of the present disclosure, and illustrates a driver and a coupler.

Referring to FIG. 6, according to a preferred embodiment of the present disclosure, the pressure vessel fixing apparatus 10 may include a through-hole 122 that passes through the frame part 100 and in which the shaft 312 is disposed, and an accommodation hole 124 that passes through the frame part 100 and in which the first clamp body 212 and the second lamp body 222 are accommodated.

The through-hole 122 may have various structures according to a condition and a design specification that are required, the present disclosure is neither limited nor restricted by a structure and a shape of the through-hole 122.

As an example, the through-hole 122 may be formed by partially removing a portion of an outer peripheral surface of the second frame member 120, and the shaft 312 may be accommodated in an interior of the through-hole 122.

In this way, because the first extension 216 and the second extension 226 may not be extended to an outer side (an outer side of a side surface) of the second frame member 120 by forming the through-hole 122 in the second frame member 120 and accommodating the shaft 312 in an interior of the through-hole 122, the first extension 216 and the second extension 226 may be manufactured in a small scale, and spatial utility and a degree of freedom may be enhanced.

Furthermore, rotation of the shaft 312 may be supported more stably by accommodating the shaft 312 in the interior of the through-hole 122 such that the shaft 312 is rotatable.

The accommodation hole 124 may have various structures according to a condition and a design specification that are required, the present disclosure is neither limited nor restricted by a structure and a shape of the accommodation hole 124.

As an example, the accommodation hole 124 may be formed by partially removing a portion of an inner peripheral surface of the second frame member 120, and the first clamp body 212 and the second clamp body 222 may be partially accommodated in an interior of the accommodation hole 124.

In this way, because an interval between the pressure vessel 20 and the second frame member 120 may be minimized by forming the accommodation hole 124 in the second frame member 120 and accommodating the first clamp body 212 and the second clamp body 222 in an interior of the accommodation hole 124, the second frame member 120 may be disposed to be adhered to the outer surface of the pressure vessel 20 more tightly, and spatial utility and a degree of freedom may be enhanced.

The second fastening member 320 may be connected to the second extension 226 through various schemes according to a condition and a design specification that are required, and the present disclosure is neither limited nor restricted by a connection structure of the second fastening member 320 and the second extension 226.

As an example, the second fastening member 320 may be integrally fixed to the second extension 226 through welding. According to another embodiment of the present disclosure, the second fastening member may be coupled (or fastened) or attached to the second extension by using a separate member.

In this way, according to the embodiment of the present disclosure, because the first clamp 210 and the second clamp 220 may be moved in a direction, in which they approach each other or become spaced apart from each other (both of the first clamp and the second clamp are moved with respect to the pressure vessel) by linearly moving the second fastening member 320 along a lengthwise direction of the first fastening member 310 in correspondence to rotation of the first fastening member 310, a displacement of the pressure vessel according to expansion and contraction thereof may be stably absorbed, and safety and reliability may be enhanced.

Because the first clamp 210 may be moved upwards (with reference to FIG. 3) with respect to the pressure vessel 20 and the second clamp 220 may be moved downwards at the same time when the pressure vessel 20 is expanded, an upward displacement DF1 and a downward displacement DF2 according to expansion and contraction of the pressure vessel 20 may be stably absorbed, and safety and reliability may be enhanced.

Furthermore, according to the embodiment of the present disclosure, because the expansion and contraction of the pressure vessel 20 may be induced maximally uniformly (not to be biased) upwards and downward with respect to the center of the pressure vessel 20 by moving the first clamp 210 upwards with respect to the pressure vessel 20 and moving the second clamp 220 downwards at the same time when the pressure vessel 20 is expanded, movement of the center of the pressure vessel 20 may be minimized when the pressure vessel 20 is expanded and contracted, and misalignment of the center of the pressure vessel 20 with respect to a component connected to the pressure vessel 20 may be minimized.

Moreover, according to the embodiment of the present disclosure, because the first clamp 210 and the second clamp 220 may be moved in a direction, in which they approach each other or become spaced apart from each other (both of the first clamp and the second clamp are moved with respect to the pressure vessel) by linearly moving the second fastening member 320 along a lengthwise direction of the first fastening member 310 in correspondence to rotation of the first fastening member 310, fastening force by the first clamp 210 and the second clamp 220 may be selectively adjusted.

Accordingly, because the fastening forces by the first clamp 210 and the second clamp 220 may be adjusted according to an amount of charged (used) hydrogen, the fastening forces by the first clamp 210 and the second clamp 220 may be maintained constantly without being influenced by the expansion and the contraction of the pressure vessel 20, and a fastening state of the pressure vessel 20 may be maintained more stably.

Referring to FIGS. 2 to 4, and 7, the driver 400 may be provided in the frame part 100 to provide a driving force for rotating the first fastening member 310.

A general driving unit that may provide a driving force for rotating the first fastening member 310 may be used as the driver 400, and the present disclosure is neither limited nor restricted by a kind and a structure of the driver 400.

As an example, a general motor may be used as the driver 400, and the driver 400 may be supported by the second frame member 210.

The driver 400 may be supported by the second frame member 120 in various schemes according to a condition and a design specification that are required. As an example, the pressure vessel fixing apparatus 10 may include a bracket 410 coupled to the second frame member 120, and the driver 400 may be press-fitted with a fixing hole 412 of the bracket 410 to be fixed.

The bracket 410 may have various structures that may fix the driver 400, and the present disclosure is neither limited nor restricted by a structure of the bracket 410.

According to a preferred embodiment of the present disclosure, the pressure vessel fixing apparatus 10 may include a coupler 420 that connects the driver 400 and the first fastening member 310 and delivers a driving force of the driver 400 to the first fastening member 310.

The coupler 420 may have various structures that may transmit the driving force of the driver 400 to the first fastening member 310.

As an example, the coupler 420 may include a coupler body 422, and a fastening hole 424 that is formed in the coupler body 422 to have a non-circular cross-sectional shape and in which the first fastening member 310 is coupled to one end thereof and the driver 400 is coupled to another end thereof.

For example, the fastening hole 424 may be formed to have a spline-shaped cross-sectional shape, the first fastening member 310 may be integrally coupled to the one end of the fastening hole 424 and the driver 400 (a rotary shaft of a motor) may be integrally coupled to another end of the fastening hole 424.

The stopper 500 is configured to optionally restrict rotation of the coupler 420.

This restricts a malfunction of the clamp and stably maintains a fastening state of the pressure vessel 200 when the driver and a controller that controls the driver break down.

That is, when the driver 400 and the controller break down, the clamp may malfunction (for example, may be moved in a direction, in which the clamp becomes spaced apart from the pressure vessel) by a malfunction (an unintended rotation) of the first fastening member 310. Furthermore, due to the malfunction of the clamp, it is difficult to firmly maintain a disposition state (fastening state) of the pressure vessel when a fastening force by the clamp becomes lower.

In particular, because a central location of the pressure vessel with respect to a valve and a pipeline fixed to the vehicle body may be misaligned when the pressure vessel is moved (separated from a proper location) due to vibration and an impact that occurs when the vehicle travels in a state, in which the clamp malfunctions (a state, in which movement of the pressure vessel is allowed), a danger of leakage of hydrogen increases at connection portions of the valve and the pipeline, and the pressure vessel, and safety and reliability are lowered.

However, in the embodiment of the present disclosure, a malfunction of the clamps (the first clamp and the second clamp) may be prevented by restricting rotation of rotation of the coupler 420 and the first fastening member 310 when the driver 400 and the controller break down, by optionally restricting rotation of the coupler 420, the fastening state of the pressure vessel 20 may be stably maintained, and safety and reliability may be enhanced.

The stopper 500 may have various structures that may optically restrict rotation of the coupler 420, and the present disclosure is neither limited nor restricted by a structure and an operation scheme of the stopper 500.

As an example, the coupler 420 may include a coupler boss 426 formed on a circumferential surface (outer peripheral surface) of the coupler body 422, and the stopper 500 may optionally restrict rotation of the coupler 420 by constricting the coupler boss 426.

According to a preferred embodiment of the present disclosure, the stopper 500 may include a stopper member 510 that may be moved from a first location for constricting the coupler boss 426 to a second location that is spaced apart from the coupler boss 426, and a stopper driver 520 that provides a driving force for moving the stopper member 510.

The stopper member 510 may be moved from the first location for constricting the coupler boss 426 to the second location that is spaced apart from the coupler boss 426.

Here, an aspect that the stopper 510 is moved from the first location to the second location is defined as a meaning that the stopper member 510 is linearly moved or moved to be curved (or rotated) from the first location to the second location.

As an example, the stopper member 510 may be linearly moved from the first location to the second location (or from the second location to the first location) along a leftward/rightward direction (with reference to FIGS. 8 and 9) with respect t the coupler 420. According to another embodiment of the present disclosure, the stopper member 510 may be rotated from the first location to the second location about one point.

Figure 8:
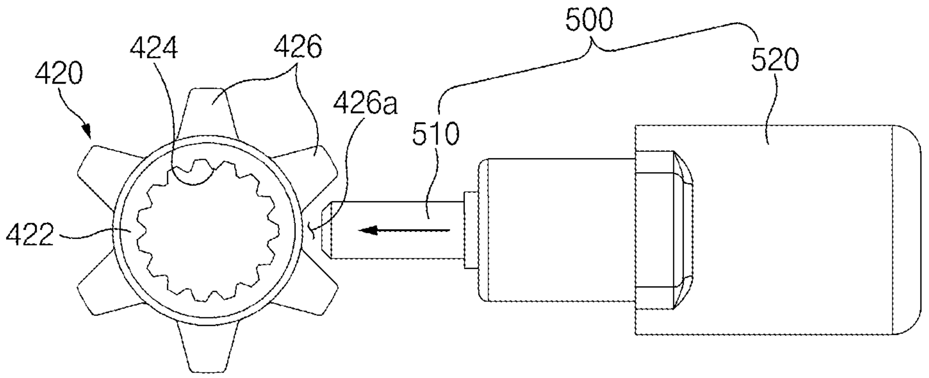
FIGS. 8 and 9 are views illustrating a pressure vessel fixing apparatus according to an embodiment of the present disclosure and illustrate an operation structure of a stopper.
Figure 9:
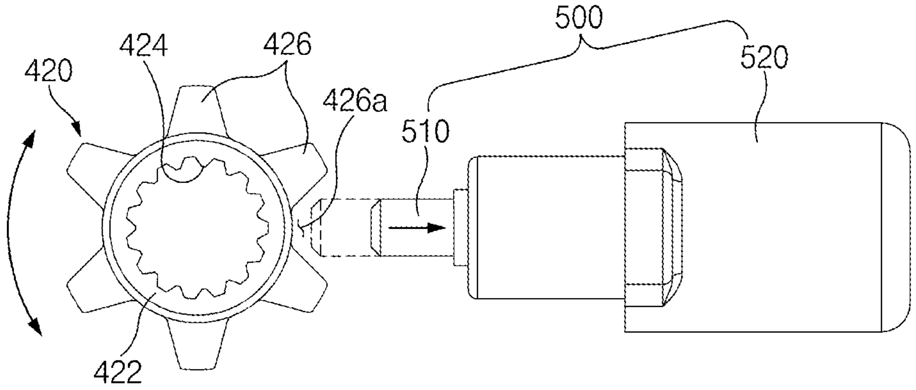

As in FIG. 8, when the stopper member 510 is moved to the first location, rotation of the coupler 420 may be constricted as the stopper member 510 contacts (interferes with) the coupler boss 426. In contrast, as in FIG. 9, when the stopper member 510 is moved to the second location, rotation of the coupler 420 may be allowed as the stopper member 510 becomes spaced apart from the coupler boss 426.

According to a preferred embodiment of the present disclosure, a plurality of coupler bosses 426 may be formed on a circumferential surface of the coupler body 422 to be spaced apart from each other along a circumferential direction, accommodation spaces **426*a* may be provided between the adjacent coupler bosses 426, and rotation of the coupler 420 may be restricted when the stopper member 510 is accommodated in the accommodation space 426*a* at the first location (see FIG. 8**).

In the above-described and illustrated embodiment of the present disclosure, as an example, it has been described that the plurality of coupler bosses 426 are formed in the coupler body 422, and the stopper member 510 enters the accommodation spaces **426*a* provided between the adjacent coupler bosses 426 to restrict rotation of the coupler 420**, but according to another embodiment of the present disclosure, rotation of the coupler may be restricted in a scheme of fitting or coupling the stopper member with (to) the coupler boss at the first location, and the present disclosure is neither limited nor restricted by a structure, the number, and an arrangement form of the coupler bosses.

Various driving units that may move the stopper member 510 from the first location to the second location may be used as the stopper driver 520, and the present disclosure is neither limited nor restricted by a kind and a structure of the stopper driver 520.

As an example, a solenoid may be used as the stopper driver 520.

For example, the solenoid may include a bobbin (not illustrated), on which a coil is wound, and a plunger (not illustrated) that is linearly moved in an interior of the bobbin as an electric voltage is applied to the coil, and the stopper member 510 may be connected to the plunger.

Preferably, the bracket 410 may have a mounting hole in correspondence to the center of the coupler body 422, and the stopper driver 520 may be mounted in the mounting hole 414.

In this way, by mounting the stopper driver 520 on the bracket provided to support (mount) the driver (but, both of the driver 400 and the stopper driver 520 are mounted by using one bracket), the structure is simplified and a degree of freedom of design and spatial utility may be enhanced.

Meanwhile, according to a preferred embodiment of the present disclosure, the pressure vessel fixing apparatus 10 may include a controller (not illustrated) that optionally controls an operation of the driver 400.

Preferably, the controller may control (for example, control of a rotational direction or control of a degree of rotation) an operation of the driver 400 according to an amount of charged (used) hydrogen that is charged in the pressure vessel 20.

As an example, the controller may be a central processing unit (CPU) or a semiconductor device that processes instructions stored in the memory and/or the storage. The memory and the storage may include various volatile or nonvolatile storage media. For example, the memory may include a read only memory (ROM) and a random access memory (RAM).

Figure 10:
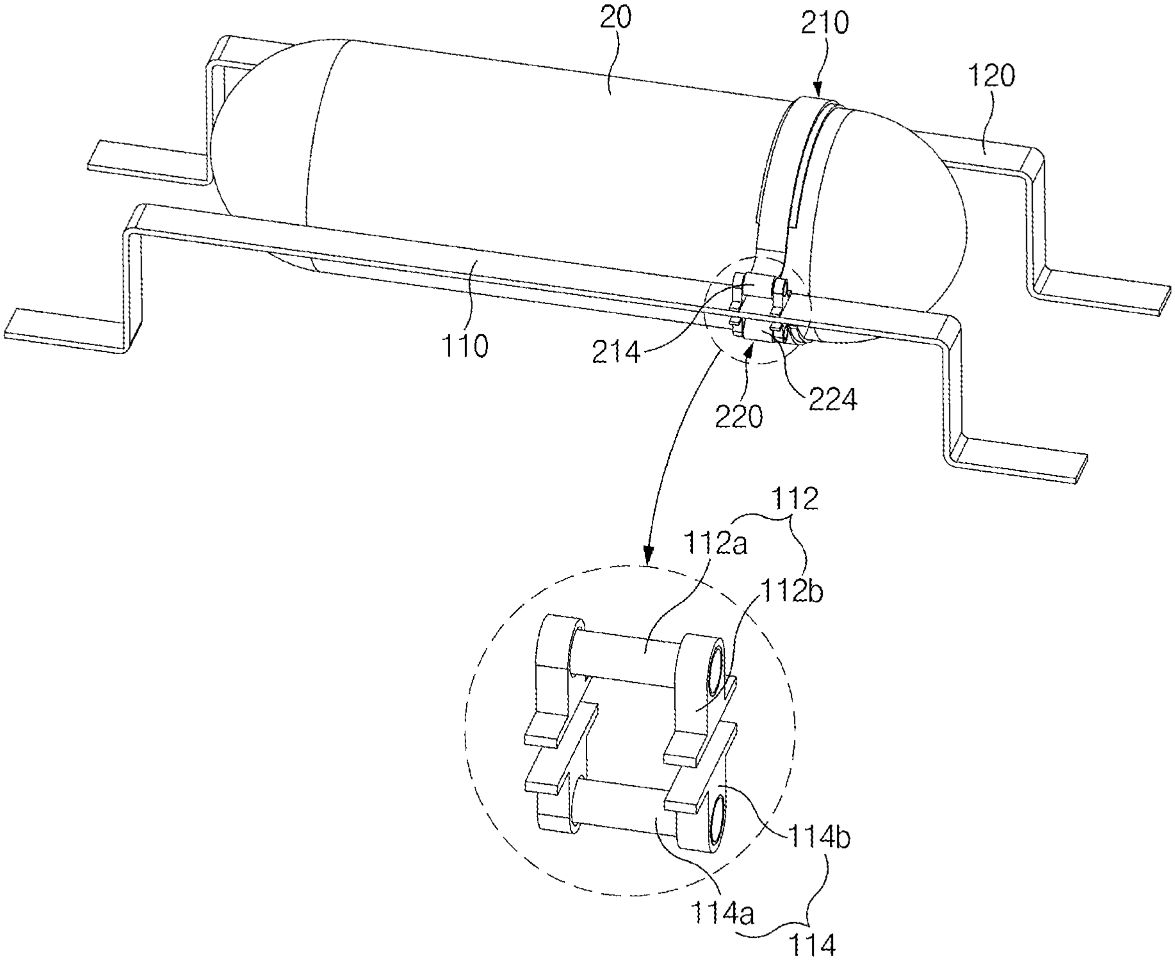
FIG. 10 is a view illustrating a pressure vessel fixing apparatus according to an embodiment of the present disclosure, and illustrates a first hinge part and a second hinge part.

Meanwhile, referring to FIG. 10, according to a preferred embodiment of the present disclosure, the pressure vessel fixing apparatus 10 may include a first hinge part 112 provided in the first frame member 110 and to which the first connector 214 is connected to be rotatable, and a second hinge part 114 provided in the first frame member 110 and to which the second connector 224 is connected to be rotatable.

The first hinge part 112 may have various structures, to which the first connector 214 may be connected to be rotatable, and the present disclosure is neither limited nor restricted by a structure of the first hinge part 112.

As an example, the first hinge part 112 may include a first hinge shaft **112*a* connected to the first connector 214, and a first hinge bracket 112*b* provided on one surface (for example, an upper surface) of the first frame member 110 and that supports the first hinge shaft 112*a* such that the first hinge shaft 112*a*** is rotatable.

For example, the first connector 214 may be bent in a form that surrounds a circumference of the first hinge shaft **112*a*, and the first hinge shaft 112*a* may be accommodated in the first connector 214** to be rotatable.

In this way, in the embodiment of the present disclosure, because not only the first extension 216 may be spaced apart from the second frame member 120 but also the entire first clamp 210 may be rotated with respect to the first frame member 110 when the pressure vessel 20 is expanded, by connecting the first connector 214 to the first frame 110 such that the first connector 214 is rotatable by a medium of the first hinge part 112, a displacement due to the expansion of the pressure vessel 20 may be absorbed more effectively, and the uniform expansion of the pressure vessel 20 may be secured.

The second hinge part 114 may have various structures, to which the second connector 224 may be connected to be rotatable, and the present disclosure is neither limited nor restricted by a structure of the second hinge part 114.

As an example, the second hinge part 114 may include a second hinge shaft **114*a* connected to the second connector 224, and a second hinge bracket 114*b* provided on another surface (for example, a bottom surface) of the first frame member 110 and that supports the second hinge shaft 114*a* such that the second hinge shaft 114*a*** is rotatable.

For example, the second connector 224 may be bent in a form that surrounds a circumference of the second hinge shaft **114*a*, and the second hinge shaft 114*a* may be accommodated in the second connector 224** to be rotatable.

In this way, in the embodiment of the present disclosure, because not only the second extension 226 may be spaced apart from the second frame member 120 but also the entire second clamp 220 may be rotated with respect to the first frame member 110 when the pressure vessel 20 is expanded, by connecting the second connector 224 to the first frame 110 such that the second connector 224 is rotatable by a medium of the second hinge part 114, a displacement due to the expansion of the pressure vessel 20 may be absorbed more effectively, and the uniform expansion of the pressure vessel 20 may be secured.

According to a preferred embodiment of the present disclosure, the pressure vessel fixing apparatus 10 may include a first elastic pad 218 interposed between the pressure vessel 20 and the first clamp 210 (for example, the first clamp body), and a second elastic pad 228 interposed between the pressure vessel 20 and the second clamp 220 (for example, the second clamp body).

As an example, the first elastic pad 218 and the second elastic pad 228 may be formed of an elastic material such as rubber, silicon, or urethane.

In this way, by providing the first elastic pad 218 between the outer peripheral surface of the pressure vessel 20 and the first clamp 210 and providing the second elastic pad 228 between the outer peripheral surface of the pressure vessel 20 and the second clamp 220, damage to and deformation of the pressure vessel 20 due to the first clamp 210 and the second clamp 220 may be minimized when the pressure vessel 20 is expanded and contracted, and noise may be minimized.

According to a preferred embodiment of the present disclosure, the pressure vessel fixing apparatus 10 may include a first force sensor 219 provided in the first clamp, and a second force sensor 229 provided in the second clamp 220.

A general sensor that may sense forces (stresses) applied to the first clamp 210 and the second clamp 220 may be used as the first force sensor 219 and the second force sensor 229, and the present disclosure is neither limited nor restricted by kinds and structures of the first force sensor 219 and the second force sensor 229. As an example, strain gauges may be used as the first force sensor 219 and the second force sensor 229.

For example, the first force sensor 219 and the second force sensor 229 may be attached to outer surfaces of the first clamp 210 and the second clamp 220. According to another embodiment of the present disclosure, the first force sensor and the second force sensor may be provided on inner surfaces of the first clamp and the second clamp.

In this way, it may be accurately determined whether the driver 400 and the controller are normally operated by providing the first sensor 219 and the second sensor 229 to the first clamp 210 and the second clamp 220.

Figure 11:
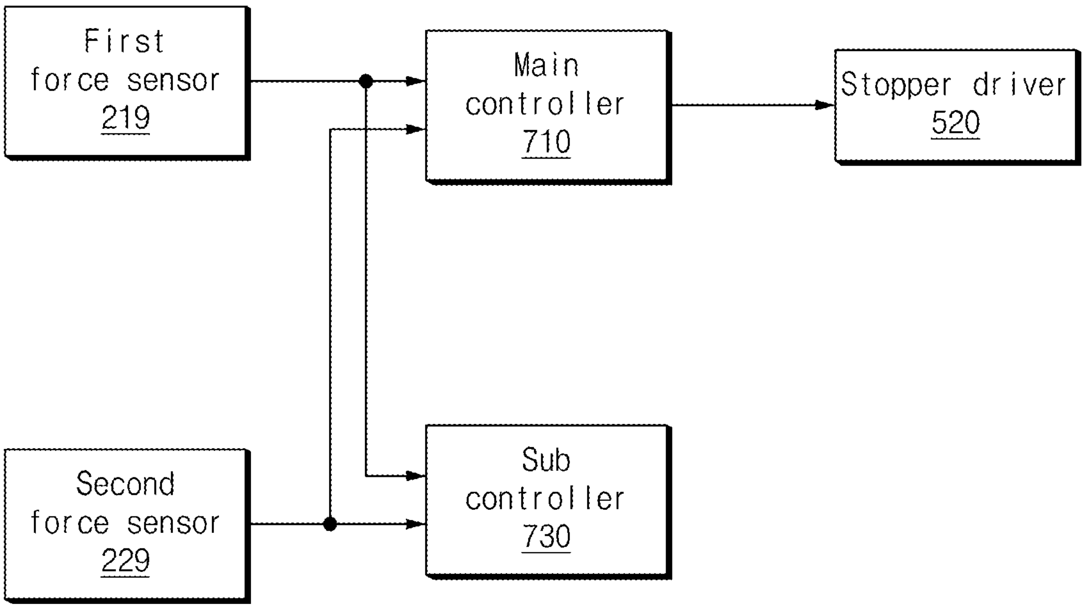
FIG. 11 is a block diagram illustrating a control process for backup of a pressure vessel fixing apparatus according to an embodiment of the present disclosure.
Figure 12:
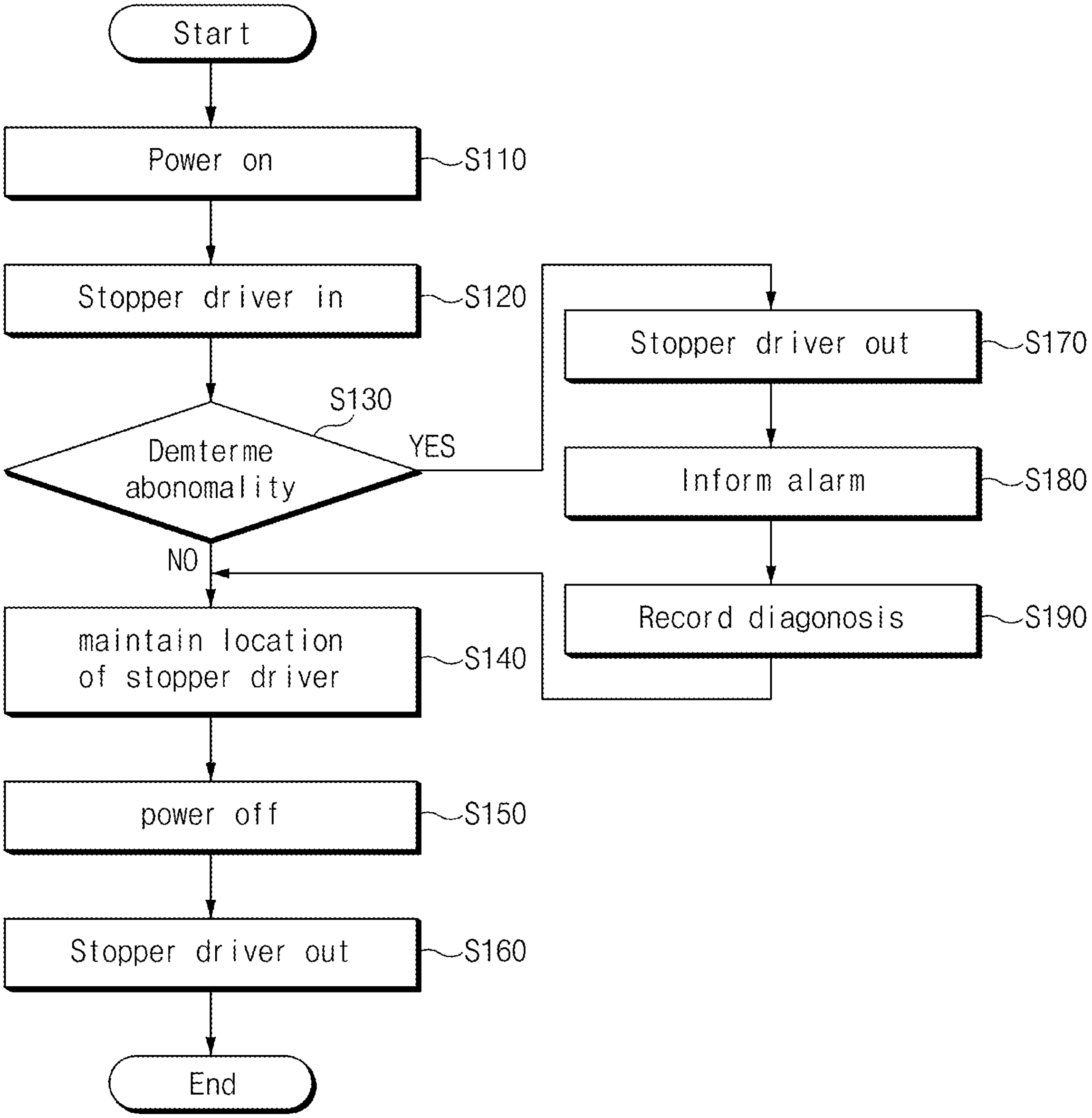
FIGS. 12 and 13 are flowcharts illustrating a control process for backup of a pressure vessel fixing apparatus according to an embodiment of the present disclosure.
Figure 13:
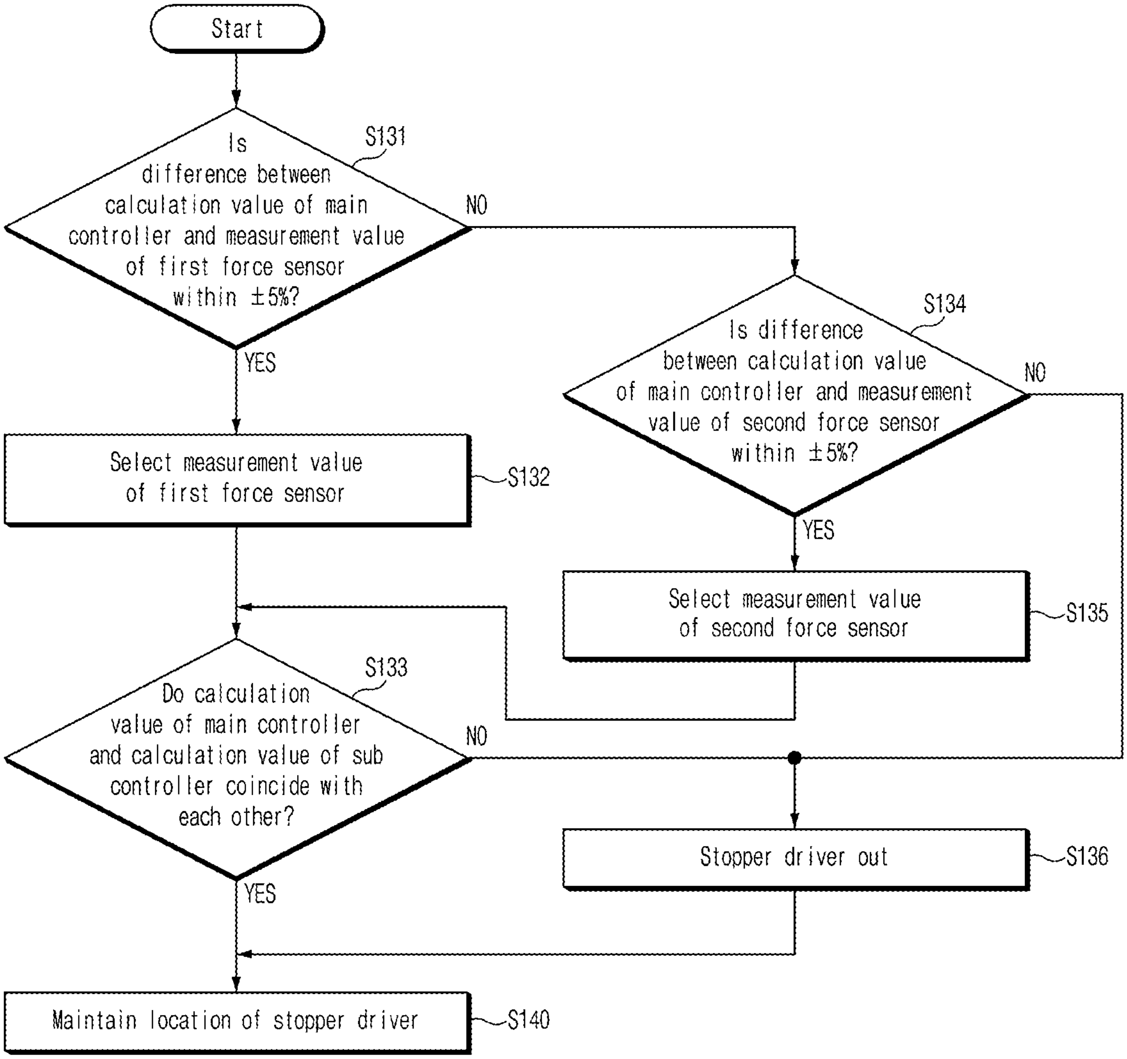

Referring to FIGS. 11 to 13, a main controller 710 and a sub controller 730 may be included to determine whether the driver 400 and the controller are normally operated.

As an example, the main controller 719 may be a hydrogen storage system management unit (HMU) that controls charging and supply of hydrogen, and the sub controller 730 may be a fuel cell control unit (FCU) that maintains an efficiency of fuel consumption by adjusting amounts of supplied hydrogen and oxygen, and controls production of electric power.

As an example, the main controller 710 may be a micro controller unit (MCU) that constitutes the HMU, and the sub controller 730 may be a sub micro controller unit (MCU) that constitutes the HMU.

The main controller 710 and the sub controller 730 may receive stresses applied to the first clamp 210 and the second clamp 220 due to an internal pressure of the pressure vessel 20 (a storage pressure of hydrogen) from the first force sensor 219 and the second force sensor 229.

Meanwhile, the stresses applied to the first clamp 210 and the second clamp 220 due to the fastening forces of the first clamp 210 and the second clamp 220 for the internal pressures of the pressure vessel 20 may be calculated by the main controller 710 and the sub controller 730 and be stored in advance in a lookup table.

For reference, the fastening forces of the first clamp 210 and the second clamp 220 may be calculated in Equations 1 and 2.

$$F = kL \quad \text{[Equation 1]}$$

$$L = \frac{RP}{2pi} \quad \text{[Equation 2]}$$

Here, F denotes a fastening force of a clamp, k denotes a strength of the clamp, L denotes a distance between the first extension 216 of the first clamp and the second extension 226 of the second clamp, R denotes a radian for rotation of the driver 400 for movement of L, and P denotes a shaft screw pitch of the first fastening member 310.

The main controller 710 may control driving of the stopper driver 520 such that the stopper member 510 is moved to the first location for constricting the coupler boss 426 or the second location, at which the stopper member 510 is spaced apart from the coupler boss 426.

When the vehicle is started and a power source is switched on (S110), the main controller 710 may move the stopper member 510 to the second location, at which the stopper member 510 is spaced apart from the coupler boss 426, by driving the stopper driver 520.

Subsequently, the main controller may repeatedly diagnose whether the driver 400 and the controller break down during driving of the vehicle at a specific time interval (S130).

First, the main controller 710 may receive a first measurement stress applied to the first clamp 210 by the first force sensor 219, and may compare the first measurement stress with a first calculation stress applied to the first clamp 210, which is calculated according to the current internal pressure of the pressure vessel 20 (S131).

Subsequently, when a difference between the first measurement stress and the first calculation stress is within 5%, the measurement stress of the first force sensor 219 may be optionally applied (S132).

Subsequently, when the first calculation stress calculated by the main controller 710 and a second calculation stress calculated by the sub controller 730 coincides with each other, it may be determined that the driver 400 and the controller are normally operated and the stopper member 510 may be controlled to maintain the second location that is spaced apart from the coupler boss 426.

Moreover, when the first measurement stress by the first force sensor 219 and the first calculation stress applied to the first clamp 210 deviates from 5%, the main controller 710 may receive the second measurement stress applied to the second clamp 220 by the second force sensor 229 and may compare with the second measurement stress with the first calculation stress applied to the first clamp 210 (S134).

Subsequently, when a difference between the second measurement stress and the second calculation stress is within 5%, the measurement stress of the second force sensor 229 may be optionally applied (S135).

Subsequently, when the first calculation stress calculated by the main controller 710 and a second calculation stress calculated by the sub controller 730 coincides with each other, it may be determined that the driver 400 and the controller are normally operated and the stopper member 510 may be controlled to maintain the second location that is spaced apart from the coupler boss 426 (S146).

Subsequently, the main controller 710 may control the stopper member 510 to be maintained at the second location that is spaced apart from the coupler boss 426 as it determines that the driver 400 and the controller are normally operated, and may control the stopper member 510 to be moved to the first location for constricting the coupler boss 426 (S160) when the vehicle finishes driving and the engine is turned off (S150).

Meanwhile, when the difference between the second measurement stress and the first calculation stress deviates 5% or the first calculation stress and the second calculation stress do not coincide with each other, the main controller 710 may determine that the driver 400 and the controller are abnormally operated, and may control the stopper member 510 to be moved to the first location for constricting the coupler boss 426 (S136).

Subsequently, as the main controller 710 determines that the driver 400 and the controller are abnormally operated, it may control the stopper member 510 to be moved to the first location for constricting the coupler boss 426 (S170), may inform a driver that the driver 400 and the controller are abnormally operated (S180), and may record a diagnostic trouble code (DTC) according to an abnormal operation in a storage device such as an EEPROM (S190).

Subsequently, when the vehicle finishes driving and the engine is turned off (S150) while the stopper member 510 is maintained at the first location for constricting the coupler boss 426 (S140), the stopper member 510 may be controlled to be maintained at the first location for constricting the coupler boss 426.

As described above, the present technology may preferentially use the measurement stress by the first force sensor 219, and may replace it by the measurement stress by the second force sensor 219 when it is determined that the first force sensor 219 is out of order.

Moreover, the calculation stress by the main controller 710 and the calculation stress by the sub controller 730 may be compared with each other for verification, and thus a calculation error may be prevented.

That is, the present technology may secure the safety of a user by applying a fail safety structure provided with a backup measure to safely fix a hydrogen tank to a hydrogen tank fixing mechanism and thus preventing leakage of hydrogen that may be generated due to a breakdown or an abnormal operation of main electronic components (a motor and a CPU) that fix the hydrogen tank.

The present technology may secure the safety of a user by applying a fail safety structure provided with a backup measure to safely fix a hydrogen tank to a hydrogen tank fixing mechanism and thus preventing leakage of hydrogen that may be generated due to a breakdown or an abnormal operation of main electronic components (a motor and a CPU) that fix the hydrogen tank.

In addition, the present disclosure may provide various effects that are directly or indirectly recognized.

The above description is a simple exemplification of the technical spirits of the present disclosure, and the present disclosure may be variously corrected and modified by those skilled in the art to which the present disclosure pertains without departing from the essential features of the present disclosure.

Accordingly, the embodiments disclosed in the present disclosure is not provided to limit the technical spirits of the present disclosure but provided to describe the present disclosure, and the scope of the technical spirits of the present disclosure is not limited by the embodiments. Accordingly, the genuine technical scope of the present disclosure should be construed by the attached claims, and all the technical spirits within the equivalent ranges fall within the scope of the present disclosure.

What is claimed is:

1. An apparatus for controlling a pressure vessel, the apparatus comprising:
- a clamp configured to surround an outer peripheral surface of the pressure vessel fixed to a subject target;
- a first fastening member disposed in the clamp to be linearly movable along a lengthwise direction of the first coupling member;
- a driver configured to provide a driving force for adjusting a fastening force of the clamp according to an internal pressure of the pressure vessel;
- a coupler that connects the driver and the first fastening member and transmits the driving force of the driver to the first fastening member;
- a stopper selectively coupled to the coupler at different locations in the lengthwise direction to restrict rotation of the driver; and
- a controller configured to perform a control of the stopper such that the rotation of the driver is prevented via the stopper during an abnormal operation of the driver.

2. The apparatus of claim 1, wherein the clamp includes:
- a first clamp configured to surround a portion of the outer peripheral surface of the pressure vessel; and
- a second clamp configured to surround another portion of the outer peripheral surface of the pressure vessel.

3. The apparatus of claim 1, wherein the controller is configured to control the stopper to be movable in a radial direction, different from the lengthwise direction, to selectively restrict the rotation of the driver.

4. An apparatus for controlling a pressure vessel, the apparatus comprising:
- a clamp configured to surround an outer peripheral surface of the pressure vessel fixed to a subject target;
- a driver configured to provide a driving force for adjusting a fastening force of the clamp according to an internal pressure of the pressure vessel; and
- a controller configured to perform a control such that rotation of the driver is prevented during an abnormal operation of the driver, wherein the clamp includes:
- a first clamp configured to surround a portion of the outer peripheral surface of the pressure vessel; and
- a second clamp configured to surround another portion of the outer peripheral surface of the pressure vessel,
- wherein the first clamp includes a first force sensor that senses a force applied to the first clamp, and
- wherein the second clamp includes a second force sensor that senses a force applied to the second clamp.

5. The apparatus of claim 4, wherein the controller includes:
- a main controller and a sub controller each configured to calculate the fastening force of the clamp, and
- wherein the controller determines that the driver is in a normal operation when the fastening force of the clamp calculated by the main controller coincides with the fastening force of the clamp calculated by the sub controller while a difference between the fastening force of the clamp measured through the first force sensor and the fastening force of the clamp calculated by the main controller is within a specific range.

6. The apparatus of claim 5, wherein, the controller determines that the driver is in the normal operation when the fastening force of the clamp calculated by the main controller coincides with the fastening force of the clamp calculated by the sub controller while a difference between the fastening force of the clamp measured through the second force sensor and the fastening force of the clamp calculated by the main controller is within the specific range, in a condition that the difference between the fastening force of the clamp measured through the first force sensor and the fastening force of the clamp calculated by the main controller deviates from the specific range.

7. The apparatus of claim 6, wherein the controller determines that the driver is in the abnormal operation when the difference between the fastening force of the clamp measured through the second force sensor and the fastening force of the clamp calculated by the main controller deviates from the specific range or the fastening force of the clamp calculated by the main controller does not coincide with the fastening force of the clamp calculated by the sub controller.

8. A method for controlling a pressure vessel, the method comprising:
- providing a driver configured to provide a driving force for adjusting a fastening force of a clamp according to an internal pressure of the pressure vessel configured to surround an outer peripheral surface of the pressure vessel through a clamp;
- providing a first fastening member in the clamp to be linearly movable along a lengthwise direction of the first coupling member;
- providing a coupler to connect the driver and the first fastening member and to transmit the driving force of the driver to the first fastening member;
- providing a stopper and selectively coupling the stopper with the coupler at different locations in the lengthwise direction to restrict rotation of the driver; and
- performing a control of the stopper such that the rotation of the driver is prevented via the stopper during an abnormal operation of the driver.

9. The method of claim 8, wherein the providing a driver configured to provide a driving force for adjusting a fastening force of a clamp according to an internal pressure of the pressure vessel configured to surround an outer peripheral surface of the pressure vessel through a clamp includes:
- providing a driving force for adjusting a fastening force between a first clamp configured to surround a portion of the outer peripheral surface of the pressure vessel and a second clamp configured to surround another portion of the outer peripheral surface of the pressure vessel.

10. The method of claim 9, wherein the performing a control of the stopper such that the rotation of the driver is prevented via the stopper during an abnormal operation of the driver includes:

receiving a measurement value of a force applied to the first clamp from a first force sensor included in the first clamp; and receiving a measurement value of a force applied to the second clamp from a second force sensor included in the second clamp.

11. The method of claim 10, wherein the performing a control of the stopper such that the rotation of the driver is prevented via the stopper during an abnormal operation of the driver includes:

calculating a fastening force of the clamp through each of a main controller and a sub controller, and wherein the method includes determining that the driver is in a normal operation when the fastening force of the clamp calculated by the main controller coincides with the fastening force of the clamp calculated by the sub controller while a difference between the fastening force of the clamp measured through the first force sensor and the fastening force of the clamp calculated by the main controller is within a specific range.

12. The method of claim 11, wherein the performing a control of the stopper such that the rotation of the driver is prevented via the stopper during an abnormal operation of the driver includes:

determining that the driver is in the normal operation when the fastening force of the clamp calculated by the main controller coincides with the fastening force of the clamp calculated by the sub controller while a difference between the fastening force of the clamp measured through the second force sensor and the fastening force of the clamp calculated by the main controller is within the specific range, in a condition that the difference between the fastening force of the clamp measured through the first force sensor and the fastening force of the clamp calculated by the main controller deviates from the specific range.

13. The method of claim 12, wherein the performing a control of the stopper such that the rotation of the driver is prevented via the stopper during an abnormal operation of the driver includes:

determining that the driver is in the abnormal operation when the difference between the fastening force of the clamp measured through the second force sensor and the fastening force of the clamp calculated by the main controller deviates from the specific range or the fastening force of the clamp calculated by the main controller does not coincide with the fastening force of the clamp calculated by the sub controller.

14. The method of claim 8, wherein the performing a control of the stopper such that the rotation of the driver is prevented via the stopper during an abnormal operation of the driver includes:

controlling the stopper to be movable in a radial direction, different from the lengthwise direction, to selectively restrict the rotation of the driver.

* * * * *